(12) United States Patent
Koji et al.

(10) Patent No.: US 9,537,389 B2
(45) Date of Patent: Jan. 3, 2017

(54) INVERTER DEVICE, TRANSFORMER, AND TRANSFORMER MANUFACTURING METHOD

(71) Applicants: Yoshinobu Koji, Tokyo (JP); Takeshi Tanaka, Tokyo (JP); Takeshi Nagata, Tokyo (JP)

(72) Inventors: Yoshinobu Koji, Tokyo (JP); Takeshi Tanaka, Tokyo (JP); Takeshi Nagata, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 81 days.

(21) Appl. No.: 14/433,540

(22) PCT Filed: Oct. 19, 2012

(86) PCT No.: PCT/JP2012/077123
§ 371 (c)(1),
(2) Date: Apr. 3, 2015

(87) PCT Pub. No.: WO2014/061154
PCT Pub. Date: Apr. 24, 2014

(65) Prior Publication Data
US 2015/0256061 A1  Sep. 10, 2015

(51) Int. Cl.
*H02M 1/44* (2007.01)
*H01F 27/24* (2006.01)
(Continued)

(52) U.S. Cl.
CPC .............. *H02M 1/44* (2013.01); *H01F 27/24* (2013.01); *H01F 27/30* (2013.01); *H01F 27/306* (2013.01);
(Continued)

(58) Field of Classification Search
CPC .............. B60L 2210/30; B60L 2210/40; B60L 2200/26; B60L 9/24; H01F 27/24; H01F 27/30; H01F 27/306; H01F 27/33; H01F 41/0233; H01F 41/06; H01F 2017/065; H01F 30/12; H02M 5/45; H02M 1/126; H02M 1/44; H02M 2001/0064; H02M 7/42; Y10T 29/49071
See application file for complete search history.

(56) References Cited

U.S. PATENT DOCUMENTS

2008/0101097 A1* 5/2008 Kawasaki ............. H01F 27/255
                                                363/20
2010/0207560 A1* 8/2010 Itoh ......................... B60L 9/24
                                                318/400.25
(Continued)

FOREIGN PATENT DOCUMENTS

JP  56-051813 A  5/1981
JP  05-175053 A  7/1993
(Continued)

OTHER PUBLICATIONS

International Search Report (PCT/ISA/210) mailed on Japanese, by the Jan. 22, 2013 Patent Office as the International Searching Authority for International Application No. PCT/JP2012/077123.
(Continued)

*Primary Examiner* — Gustavo Rosario Benitez
(74) *Attorney, Agent, or Firm* — Buchanan Ingersoll & Rooney PC

(57) ABSTRACT

Provided is an inverter device that can reduce high-frequency noise. The inverter device includes a transformer for converting the voltage of the AC power output from an inverter circuit and outputting the resulting power. Each of first to third coil sections for converting the voltage of the AC power output from the inverter circuit and outputting the resulting power includes an inner coil respectively wound around first to third core sections and an outer coil. The first to third core sections are each column shaped having an axis in the Y direction, and are arranged in the Z direction. Non-magnetic pressing members are provided between the adjacent coil sections and between the adjacent coil sections.

(Continued)

The pressing members press against the adjacent coil sections and the adjacent coil sections respectively.

8 Claims, 12 Drawing Sheets

(51) Int. Cl.
    *H01F 27/30*     (2006.01)
    *H01F 27/33*     (2006.01)
    *H01F 41/02*     (2006.01)
    *H01F 41/06*     (2016.01)
    *H02M 7/42*     (2006.01)
    *H01F 30/12*     (2006.01)

(52) U.S. Cl.
    CPC .......... *H01F 27/33* (2013.01); *H01F 41/0233* (2013.01); *H01F 41/06* (2013.01); *H02M 7/42* (2013.01); *B60L 2200/26* (2013.01); *H01F 30/12* (2013.01); *Y10T 29/49071* (2015.01)

(56) References Cited

U.S. PATENT DOCUMENTS

2010/0284205 A1\* 11/2010 Noda ...................... H01F 30/04
                                                                                                                        363/71

2011/0006869 A1\* 1/2011 Huh ........................ H01F 38/10
                                                                                                                          336/221

2011/0043038 A1\* 2/2011 Tsutsumi .................. B60L 9/00
                                                                                                                        307/48

2011/0248813 A1\* 10/2011 Noda .................... H01F 27/365
                                                                                              336/221

2012/0000739 A1\* 1/2012 Nogi ........................ B60M 3/04
                                                                                               191/50

2012/0154090 A1\* 6/2012 Noda ........................ B60L 9/16
                                                                                            336/148

FOREIGN PATENT DOCUMENTS

| JP | 08-222458 A | 8/1996 |
|---|---|---|
| JP | 10-050532 A | 2/1998 |
| JP | 2001-244121 A | 9/2001 |
| JP | 2012-065375 A | 3/2012 |

OTHER PUBLICATIONS

Office Action (Notification of Reasons for Rejection) issued on Jul. 9, 2013, by the Japanese Patent Office in corresponding Japanese Patent Application No. 2013-519663 and an English Translation of the Office Action. (6 pages).

\* cited by examiner

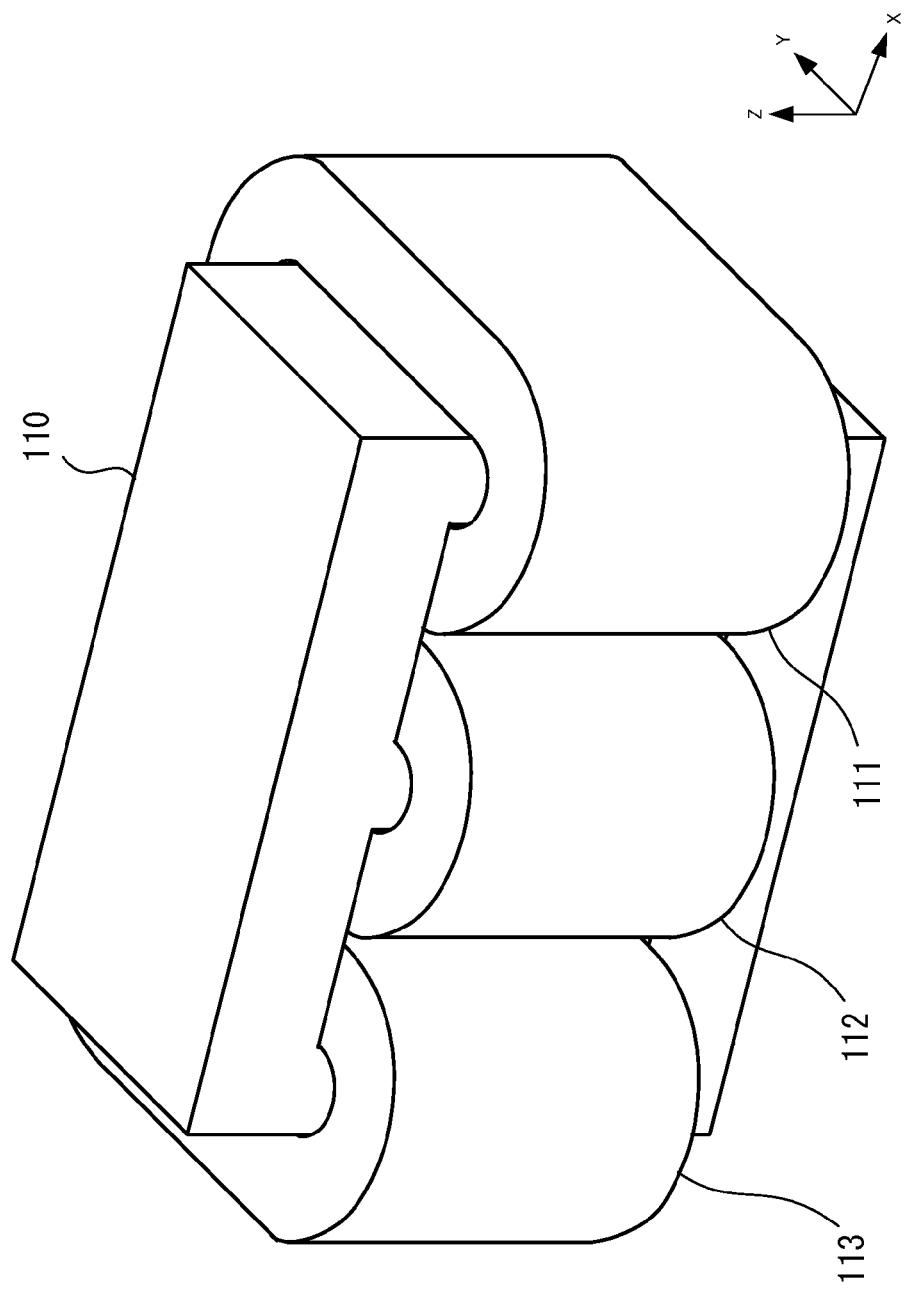

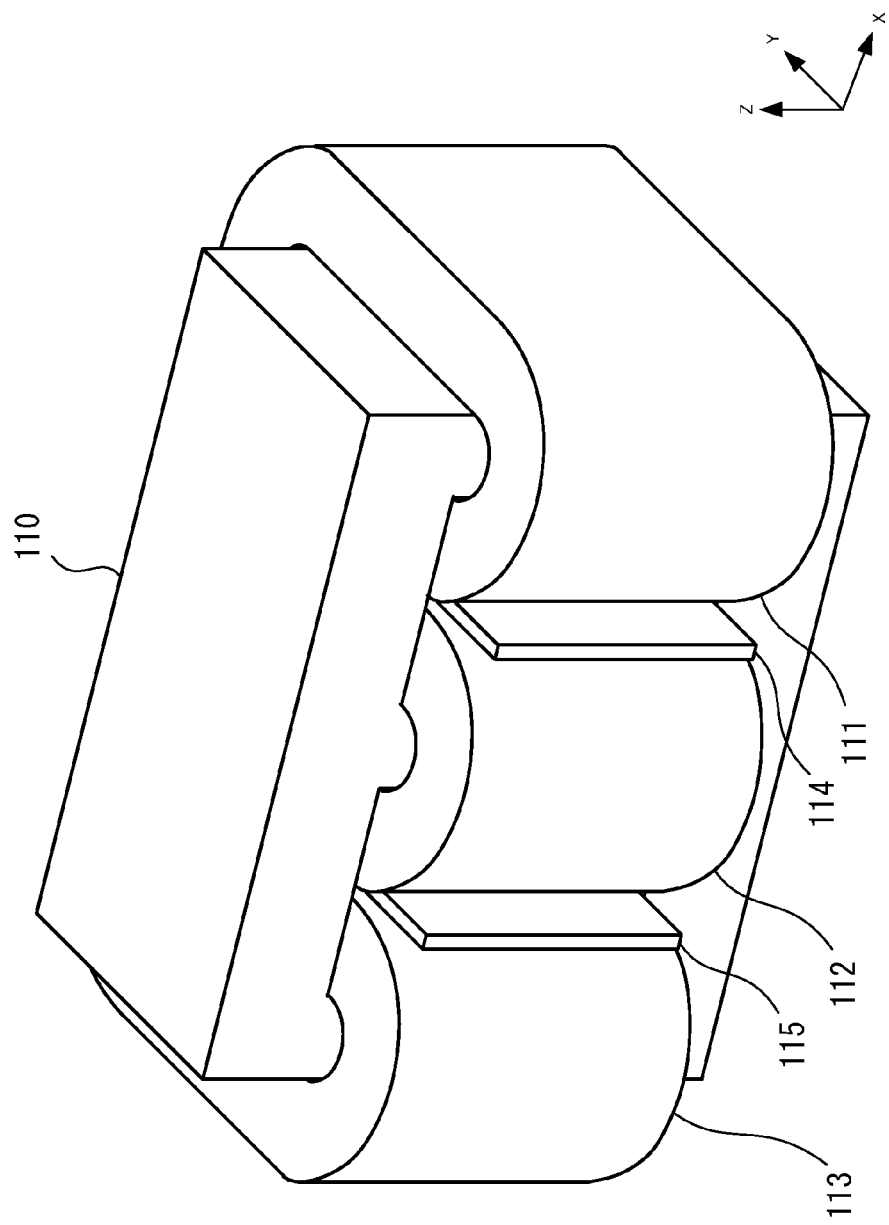

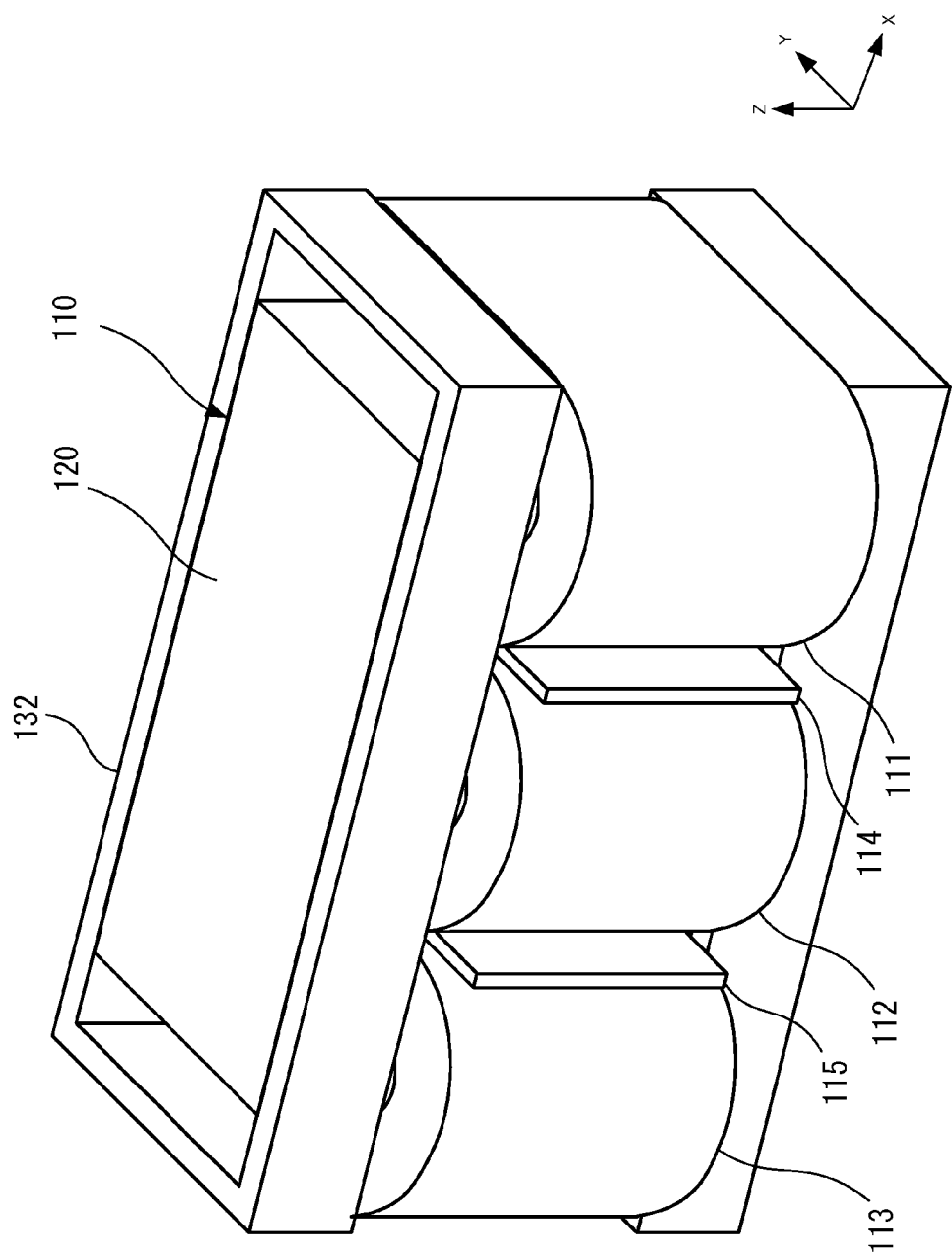

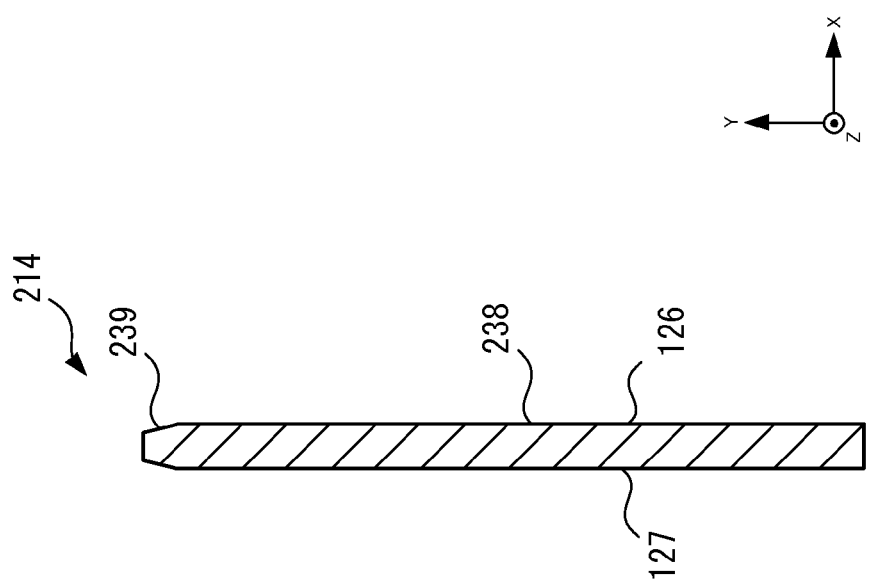

INVERTER DEVICE, TRANSFORMER, AND TRANSFORMER MANUFACTURING METHOD

TECHNICAL FIELD

The present disclosure relates to an inverter device, a transformer and transformer manufacturing method.

BACKGROUND ART

In electric trains on which inverter devices are installed, there are cases in which passengers feel uncomfortable because of noise emitted from transformers with which the inverter devices are provided. In order to reduce the noise of the transformers, technology has been proposed that curtails vibration caused by magnetostrictive motion of iron core (for example, see Patent Literature 1).

CITATION LIST

Patent Literature

Patent Literature 1: Unexamined Japanese Patent Application Kokai Publication No. H05-175053.

SUMMARY OF INVENTION

Technical Problem

Because noise caused by vibration of the iron core is predominantly low-frequency, even if the vibration of the iron core is curtailed by the technology disclosed in Patent Literature 1, there is virtually no reduction of high-frequency noise. What people typically sense as jarring to the ears is noise with high frequencies of around 1 kHz to 10 kHz, so it is particularly important to reduce high-frequency noise.

The present disclosure was devised in light of circumstances like the above, and an objective thereof is to provide an inverter device, a transformer and transformer manufacturing method capable of reducing high-frequency noise.

Solution to Problem

In order to achieve the above objective, the inverter device for railway cars according to the present disclosure includes:

an inverter circuit that converts direct-current (DC) power into alternating-current (AC) power and outputs the AC power; and a transformer that converts the voltage of the AC power output from the inverter circuit and outputs AC power at the converted voltage;

wherein the transformer includes:

an iron core having a plurality of core sections each with a column shape having an axis in a first direction, the plurality of core sections being arranged in a second direction orthogonal to the first direction;

a plurality of coil sections, each including an inner coil wound around each of the plurality of core sections and an outer coil wound around the inner coil, that convert the voltage of the AC power output from the inverter circuit and output AC power at the converted voltage; and a pressing member that is a non-magnetic substance arranged by being press-inserted between all adjacent coil sections among the plurality of coil sections, the pressing member having a thickness that presses against each of the adjacent coil sections toward each of the plurality of core sections around which each of the adjacent coil sections is wound with a force at least as great as the maximum value of force generated in each inner coil and outer coil included in each of the adjacent coil sections due to harmonic currents; and a holder arranged to hold the plurality of coil sections positioned at both ends from the exterior in the second direction, the holder pressing against each of the plurality of coil sections positioned at both ends toward each of the plurality of core sections around which each of the plurality of coil sections is wound with a force at least as great as the maximum value of force generated in each inner coil and outer coil included in each of the plurality of coil sections positioned at both ends due to harmonic currents, wherein the iron core is formed by accumulating rectangular thin plates in which a rectangular hole is provided, the holder includes, a first abutment member that is slab-shaped, having an abutment section that abuts one of the exterior surfaces of the plurality of coil sections positioned at both ends, and an extension section that is provided so as to extend from the abutment section in both the first direction and the opposite direction, a second abutment member that is slab-shaped, having an abutment section that abuts the other of the exterior surfaces of the plurality of coil sections positioned at both ends, and an extension section that is provided so as to extend from the abutment section in both the first direction and the opposite direction, and is provided so as to face the extension section of the first abutment member, attachment members of a length shorter than the distance between the exterior surfaces of the plurality of coil sections positioned at both ends, the attachment members being provided between each of the opposing extension sections of the first and the second abutment members, and a plurality of bolts and nuts for fastening both ends of the attachment members to the extension sections positioned near the ends thereof, wherein the plurality of bolts and nuts is tightened with a predetermined tightening force, thereby pressing against each of the exterior surfaces of the plurality of coil sections positioned at both ends toward each of the plurality of core sections around which each of the plurality of coil sections is wound with a force at least as great as the maximum value of the force by the slab-shaped first abutment member and the slab-shaped second abutment member.

Advantageous Effects of Invention

With the present disclosure, the pressing member presses against the adjacent coil sections. Through this, it is possible to curtail high-frequency vibrations caused by harmonic currents flowing through these coil sections. Accordingly, it is possible to reduce high-frequency noise.

BRIEF DESCRIPTION OF DRAWINGS

FIG. 9 is a perspective view illustrating the state of first to third coil sections provided in the iron core;

FIG. 10 is a perspective view illustrating the state with first and second pressing members provided;

FIG. 11 is a perspective view illustrating the state with attachment members provided on the iron core; and FIG. 12 is a cross-sectional view in the XY-plane of a first pressing member according to a modified embodiment.

DESCRIPTION OF EMBODIMENTS

Hereinafter, an embodiment of the present disclosure is described with reference to the drawings. In all drawings, the same signs are given to the same parts.

Figure 1:
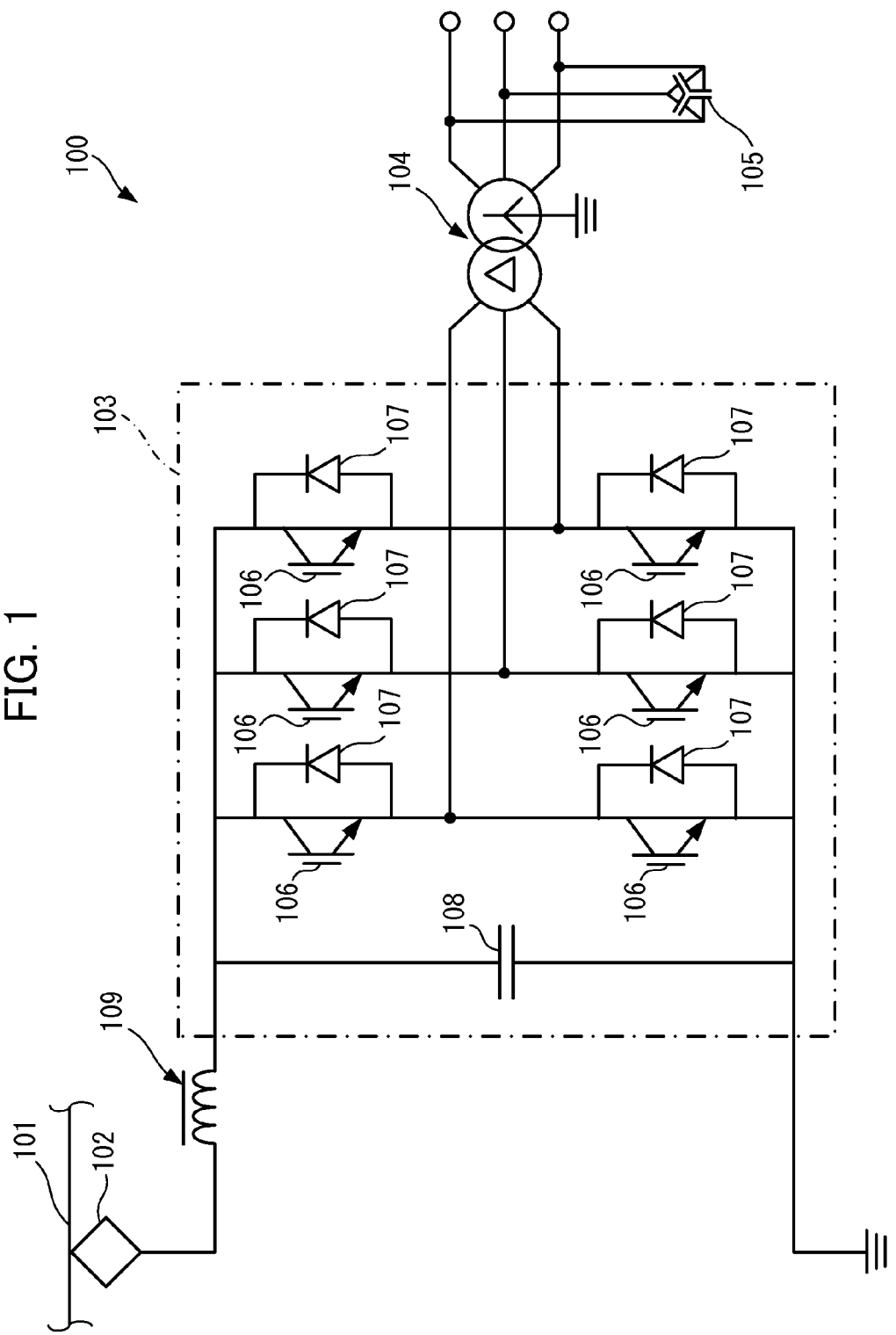
FIG. 1 is a drawing illustrating the circuit configuration of an inverter device according to an embodiment of the present disclosure.

An inverter device 100 according to the embodiment of the present disclosure is a device that converts input DC power into three-phase AC power of a desired voltage and outputs the resulting power. The inverter device 100 is a static inverter provided, for example on an electric train, with for example 1,500 V DC power taken in by a current collector 102 from overhead wiring 101 as input power, and converts the DC power into three-phase AC power of a desired voltage and outputs the resulting power to a three-phase AC motor that is a load. The inverter device 100 has the circuit configuration illustrated in FIG. 1, and is provided with an inverter circuit 103, a transformer 104 and an AC filter 105.

The inverter circuit 103 is a circuit that converts the input DC power into AC power and outputs the resulting power, and is provided with six sets of switching elements 106 and diode elements 107, and a filter capacitor 108 connected in parallel therewith. The switching elements 106 and diode elements 107 forming the sets are connected in parallel. Two sets of the switching elements 106 and diode elements 107 are connected in series. The two sets of switching elements 106 and diode elements 107 connected in series are connected in parallel in three lines. Wires for supplying power to the transformer 104 are connected between the sets of switching elements 106 and diode elements 107 connected in series. The switching elements 106 and diode elements 107 are for example made of silicon.

In the inverter circuit 103, DC power taken in from the overhead wiring 101 by the current collector 102 comprising a pantograph and/or the like is input via a DC filter reactor 109. By going through the DC filter reactor 109, it is possible to curtail harmonic currents from flowing into the inverter circuit 103, the harmonic currents being contained in the DC power taken in from the overhead wiring 101.

The DC power input into the inverter circuit 103 has the high-frequency component reduced by the filter capacitor 108, and flows to the sets of switching elements 106 and diode elements 107. Furthermore, the sets of switching elements 106 and diode elements 107 perform ON/OFF operations under control of an unrepresented controller. Through these operations, from each of the three lines of switching elements 106 and diode elements 107 connected in parallel, AC power corresponding to each phase of three-phase AC is output via wiring output to the transformer 104.

Figure 2A:
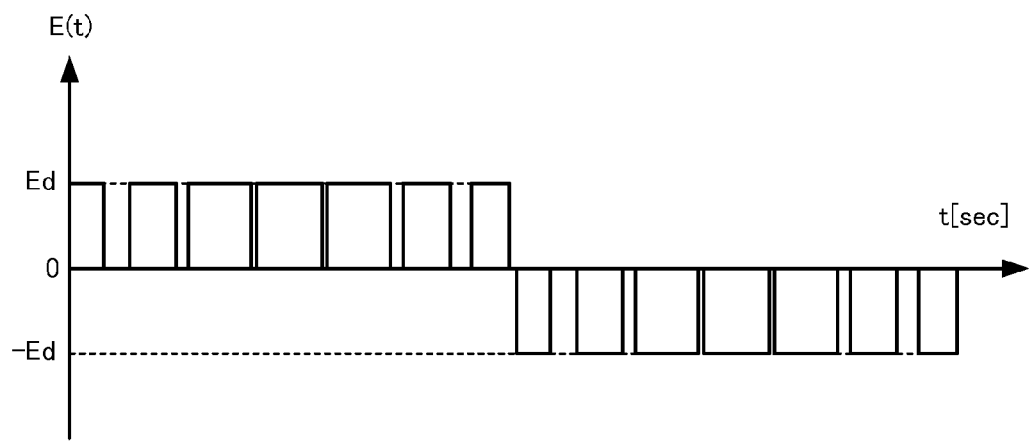
FIG. 2A is a drawing illustrating one example of a voltage waveform for AC power output from the inverter circuit.
Figure 2B:
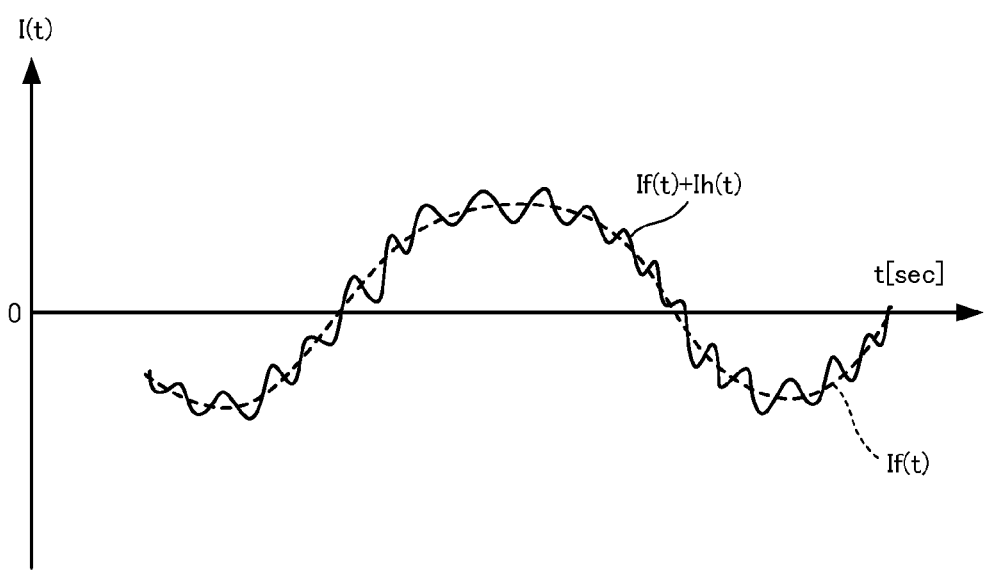
FIG. 2B is a drawing illustrating one example of a voltage waveform for AC power output from the inverter circuit.

An example of the voltage waveform and current waveform of one of the AC power output from the inverter circuit 103 are illustrated in FIG. 2A and FIG. 2B.

Alternating current I(t) output from the inverter circuit 103 is a waveform in which a harmonic component Ih(t) is superimposed on a sinusoidal wave component If(t) that is a base wave, as illustrated in Formula (1). Because of the ON/OFF operations of the switching elements 106, harmonic currents are included in the alternating current I(t) output from the inverter circuit 103 as illustrated in FIG. 2B.

$$I(t)=If(t)+Ih(t) \qquad \text{Formula (1)}$$

The transformer 104 converts the AC power output from the inverter circuit 103 into AC power of a desired voltage and outputs the resulting power. The transformer 104 according to this embodiment is a three-phase transformer that converts the three-phase AC voltage output from the inverter circuit 103, and outputs three-phase alternating current of a desired voltage.

The AC filter 105 includes three capacitors respectively connected to three wires for outputting each phase of AC power at a voltage converted by the transformer 104. The AC filter 105 bypasses the high-harmonic current output from the transformer 104, and in addition to outputting smooth alternating current, shapes the output AC voltage into a smooth sinusoidal wave.

The physical configuration of the transformer 104 according to the embodiment is explained with reference to the drawings.

Figure 3:
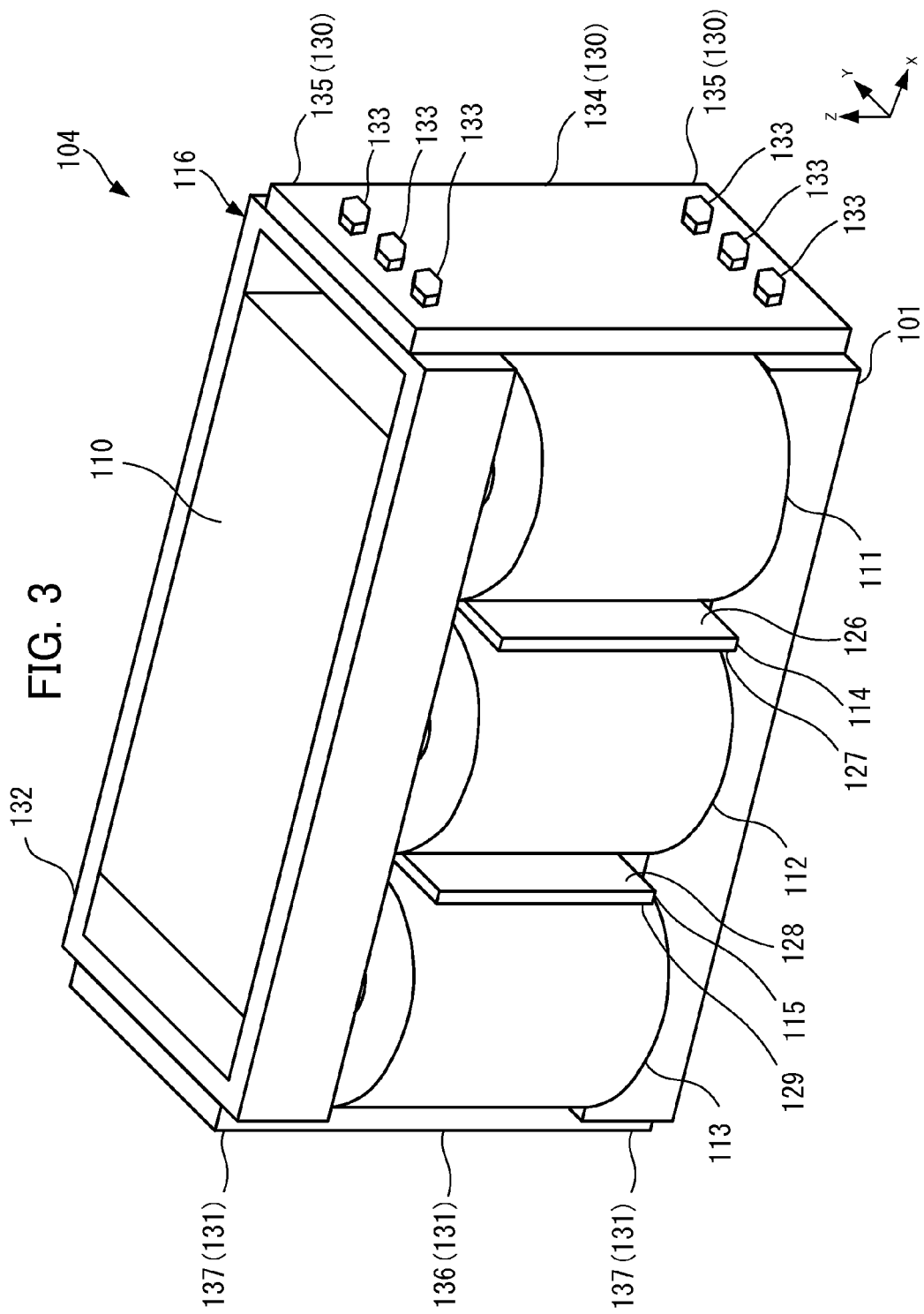
FIG. 3 is an external perspective view of a transformer according to the embodiment.
Figure 4:
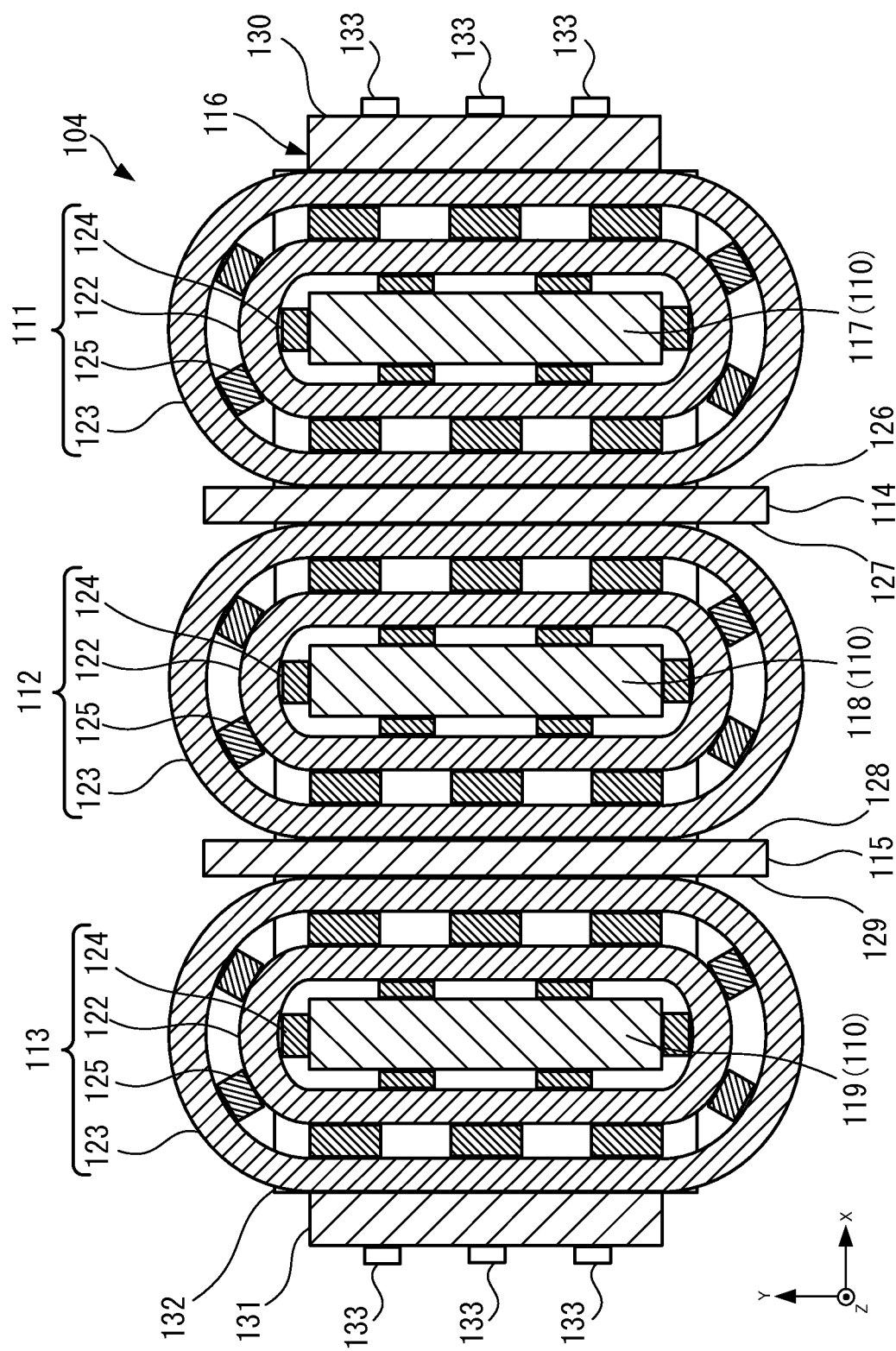
FIG. 4 is a cross-sectional view in the XY-plane of the transformer according to the embodiment.

FIG. 3 illustrates an external perspective view of the transformer 104, and FIG. 4 illustrates a cross section on the XY-plane as seen from the +Z (upward) direction. As illustrated in these drawings, the transformer 104 is provided with an iron core 110, a first coil section 111, a second coil section 112, a third coil section 113, a first pressing member 114, a second pressing member 115 and a holder 116.

Figure 5:
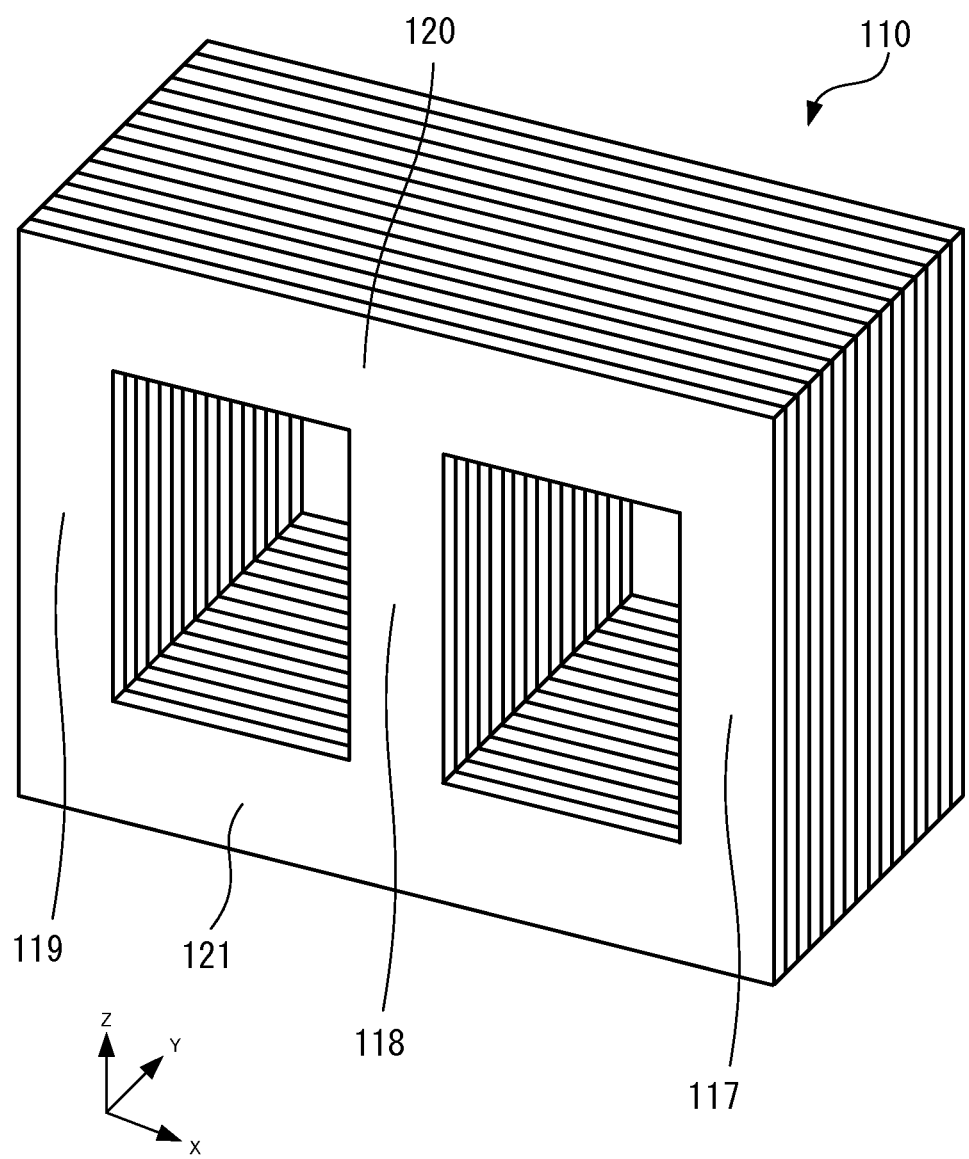
FIG. 5 is an external perspective view of an iron core according to the embodiment.
Figure 6:
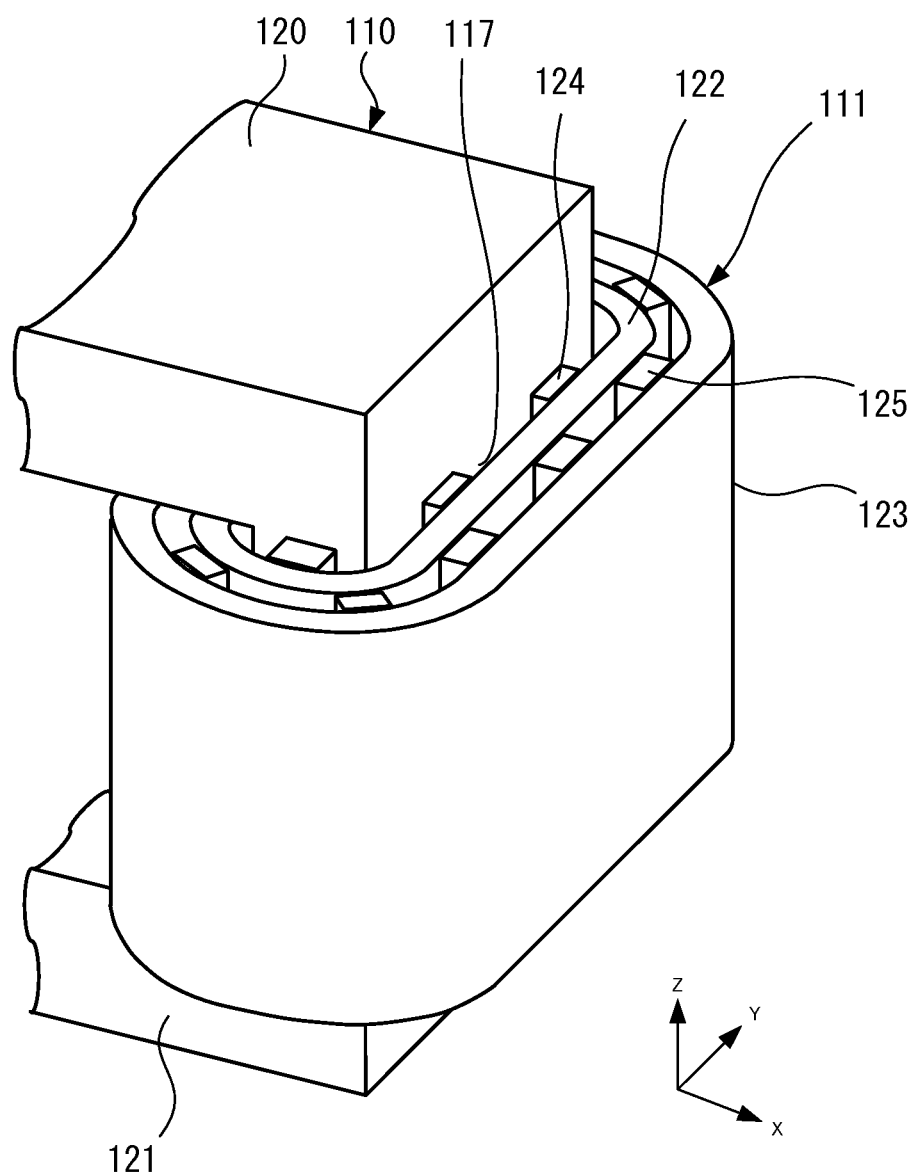
FIG. 6 is a perspective view illustrating an enlargement of a first coil section.

The iron core 110 is an iron member in which the first to third coil sections 111 to 113 are provided, as illustrated in the perspective view in FIG. 5, is formed by accumulating rectangular thin plates in which two rectangular holes are formed and is provided with a first core section 117, a second core section 118, a third core section 119, a top coupler 120 and a bottom coupler 121.

Each of the first to third core sections 117 to 119 has a prismatic shape with the same length in the Z direction, and the core sections are arranged in the X direction with equidistance spacing.

The top coupler 120 and the bottom coupler 121 are sections that link the top edges and the bottom edges, respectively, of the first to third core sections 117 to 119.

The first coil section 111 is wound around the first core section 117, and converts one phase of voltage out of the three-phase AC output from the inverter circuit 103 and outputs AC power at the converted voltage. As illustrated in the enlarged perspective view in FIG. 7, the first coil section 111 is provided with an inner coil 122, an outer coil 123, inner spacers 124 and outer spacers 125.

The inner coil 122 is formed by windings wound around the first core section 117, and is, for example, a secondary coil that outputs AC power at the converted voltage. The outer coil 123 is formed by windings wound around the inner coil, and for example, one phase of AC power of the three-phase AC output from the inverter circuit 103 is input thereto. The material of the windings forming the inner coil 122 and the outer coil 123 is, for example, copper.

The inner spacers 124 are long, slender members of prismatic shape, and are longer than the length of the inner coil 122 in the Z direction. Multiple inner spacers 124 are provided, with the lengthwise direction thereof in the Z direction and creating a predetermined gap between the first core section 117 and the inner coil 122. Through this, a gap penetrating in the Z direction is formed between the first core section 117 and the inner coil 122. Because air flows through the gap when the transformer 104 is in operation, it is possible to diffuse heat generated by the inner coil 122.

The outer spacers 125 are long, slender members of prismatic shape and are longer than the length of the outer coil 123 in the Z direction. Multiple outer spacers 125 are provided, with the lengthwise direction thereof in the Z direction and creating a predetermined space between the inner coil 122 and the outer coil 123. Through this, a gap penetrating in the Z direction is formed between the inner coil 122 and the outer coil 123. Because air flows through the gap when the transformer 104 is in operation, it is possible to diffuse heat generated by the inner coil 122 and the outer coil 123.

Similar to the first coil section 111, the second coil section 112 and the third coil section 113 are provided with an inner coil 122, outer coil 123, inner spacers 124 and outer spacers 125 that are provided around the second core section 118 and the third core section 119, respectively. Each of the first to third coil sections 111 to 113 convert a mutually different one phase of voltage of the three-phase AC output from the inverter circuit 103 and output the AC power at the converted voltage. Through this, it is possible to output three-phase AC at the converted voltage, with three-phase AC as input.

As illustrated in FIGS. 3 and 4, the first pressing member 114 is a slab-shaped member interposed between the adjacent first coil section 111 and second coil section 112, and is made of a strong material that is a non-magnetic material such as stainless steel, ceramic and/or the like. Because this member is non-magnetic, it is possible to curtail heat generated accompanying changes in magnetic field.

The first pressing member 114 has two mutually parallel main surfaces 126 and 127, with one of the main surfaces 126 abutting the first coil section 111 and the other main surface 127 abutting the second coil section 112. The thickness of the first pressing member 114 is determined so that the first coil section 111 is pressed toward the first core section 117 and the second coil section 112 is pressed toward the second core section 118. Accordingly, the material of the first pressing member 114 is preferably a material with strength sufficient to be able to press against the first and second coil sections 111 and 112.

The principle behind high-frequency noise being generated from the first to third coil sections 111 to 113 is explained with reference to the drawings, taking the first coil section 111 as an example.

Figure 7:
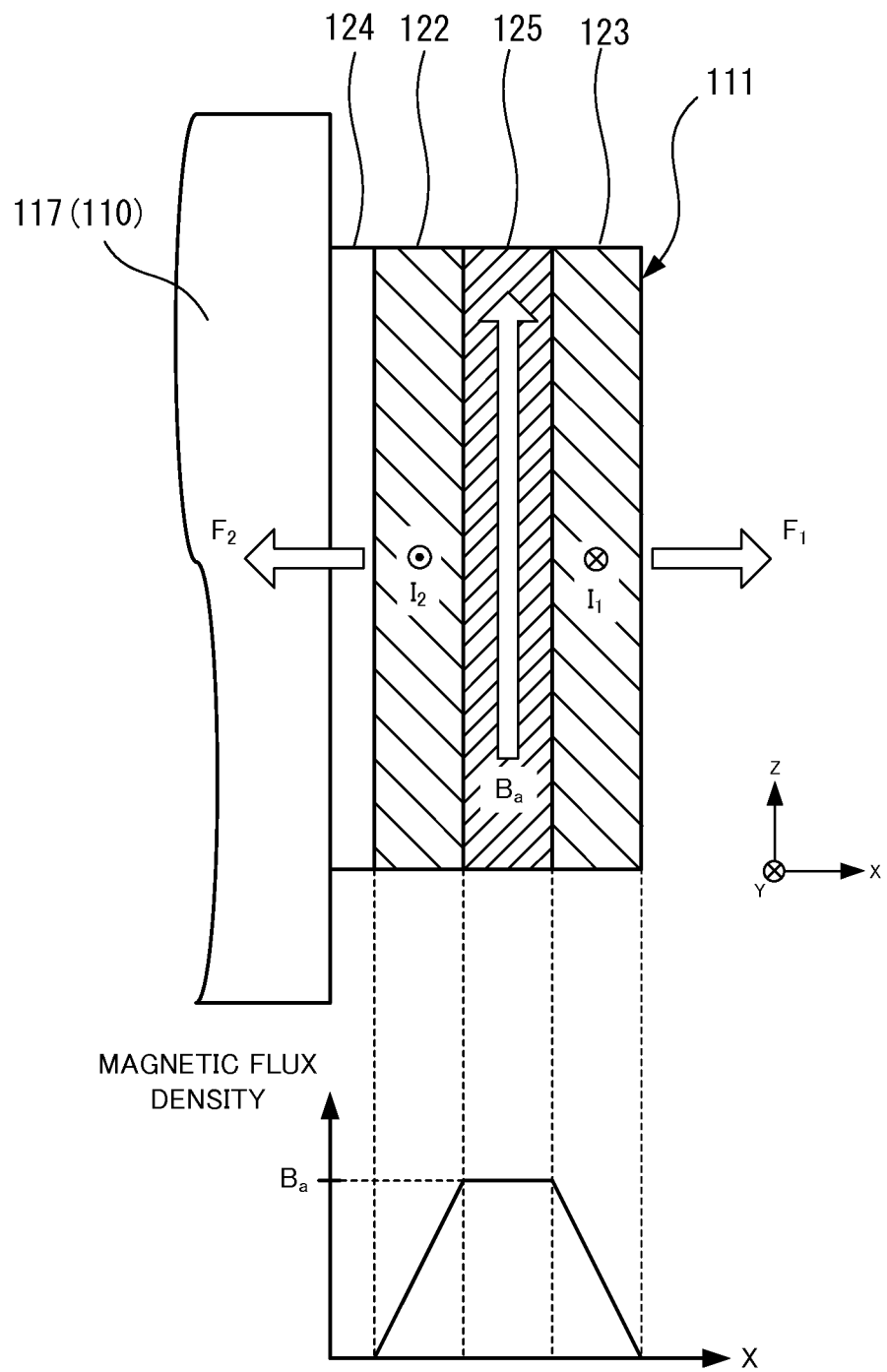
FIG. 7 is a drawing for explaining the power generated in the exterior of the first coil section.

As illustrated in FIG. 7, suppose that the magnetic flux density of the leakage flux generated in the gap between the outer coil 123 and the inner coil 122 is $B_a$, the current flowing in the outer coil 123 is $I_1$, and the current flowing in the $-Y$ direction in the inner coil 122 is $I_2$. Then, the positive direction of the magnetic flux is the $+Z$ direction, the positive direction of the electric current $I_1$ flowing in the outer coil 123 is the $+Y$ direction, and the positive direction of the electric current $I_2$ flowing in the inner coil 122 is the $-Y$ direction.

The magnetic flux density $B_a$ is expressed by Formula 2.

[Math 1]

$$B_a = \frac{1}{S}\int E(t)dt \qquad \text{Formula (2)}$$

$E(t)$ expresses the amount of leakage flux out of the AC voltage output from the inverter circuit 103. S expresses the cross-sectional area of the space provided between the outer coil 123 and the inner coil 122, when viewed from the Z direction.

The AC voltage $E(t)$ output from the inverter circuit 103 is a rectangular wave as illustrated in FIG. 2A and includes numerous harmonic components. However, the magnetic flux density $B_a$ is a value found by integrating the AC voltages $E(t)$ as illustrated in Formula (2), so the harmonic components included in the AC voltages $E(t)$ are virtually unexpressed in the waveform of the magnetic flux density $B_a$. That is to say, the magnetic flex density $B_a$ generally becomes a sinusoidal wave that is a fundamental wave. A portion of the magnetic flux respectively penetrates into the outer coil 123 and the inner coil 122 as illustrated in FIG. 7.

The alternating current $I(t)$ output from the inverter circuit 103 includes the harmonic component $Ih(t)$, as described above. The harmonic component $Ih_1(t)$ or $Ih_2(t)$ of the alternating current $I_1(t)$ or $I_2(t)$ flowing in the outer coil 123 or the inner coil 122 is reduced by the reactance component of the outer coil 123 or the inner coil 122 but still remains. Consequently, the alternating current $I_1(t)$ or $I_2(t)$ flowing in the outer coil 123 or the inner coil 122 is a waveform obtained by superimposing the harmonic current component $Ih_1(t)$ or $Ih_2(t)$ on a sinusoidal wave component $If_1(t)$ or $If_2(t)$ that is a fundamental wave, as illustrated in Formula (3) and Formula (4).

$$I_1(t)=If_1(t)+Ih_1(t) \qquad \text{Formula (3)}$$

$$I_2(t)=If_2(t)+Ih_2(t) \qquad \text{Formula (4)}$$

The electromagnetic force $F_1$ per unit length generated in the windings of the outer coil 123 is expressed by the cross product of the alternating current $I_1(t)$ flowing in the outer coil 123 and the magnetic flux density $B_a$, with each in vector notation in Cartesian coordinate system, as illustrated in Formula (5).

[Math 2]

$$\vec{F}_1 = \vec{I}_1 \times \vec{B}_a = (\vec{If}_1 + \vec{Ih}_1) \times \vec{B}_a = \vec{If}_1 \times \vec{B}_a + \vec{Ih}_1 \times \vec{B}_a \qquad \text{Formula (5)}$$

Figure 8:
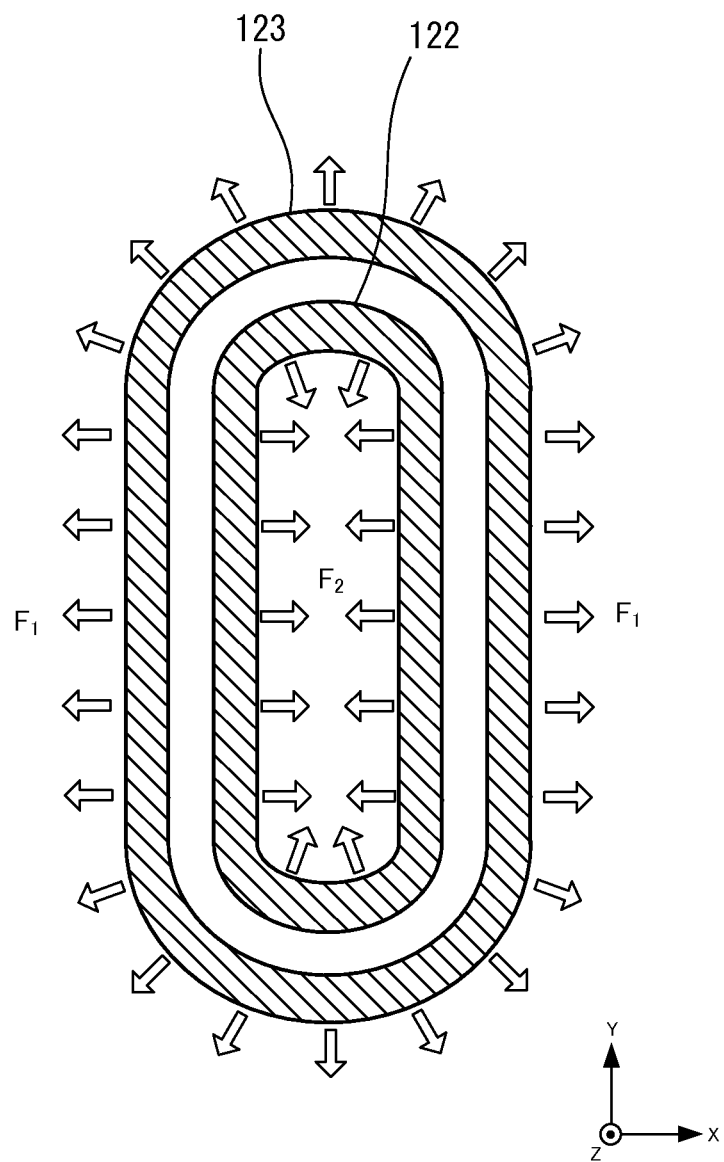
FIG. 8 is a drawing for explaining the power generated respectively in the inner coil and the outer coil of the first coil section.

The electromagnetic force $F_1$ generated in the outer coil 123 is largely generated in the XY-plane. For example, supposing that a current $I_1(t)$ flows in the $+Y$ direction and there is a magnetic field of magnetic flux density $B_a$ in the $+Z$ direction in the outer coil 123, the electromagnetic force $F_1$ acts in a direction to widen the outer coil 123 toward the exterior, as in the cross-sectional view of the outer coil 123 as seen from the $+Z$ direction illustrated in FIG. 8.

In general, the harmonic current components $Ih_1(t)$ and $Ih_2(t)$ are smaller than the fundamental wave components $If_1(t)$ and $If_2(t)$, with 20% or less being typical. Consequently, as can be seen from Formula (5), among the components included in the electromagnetic force $F_1$, the force $If_1 \times B_a$ exerted by the fundamental wave (for example, the 60 Hz component) becomes a greater value than the force $Ih_1 \times B_a$ exerted by the harmonics. However, in general people do not sense low-frequency sounds as jarring to the ears but acutely sense even small sounds as jarring to the ears in the case of high-frequency sounds of around 1 kHz to 10 kHz. For example, in the case of the fundamental wave current $If_1$ of 60 Hz, the sound generated by the outer coil 123 vibrating due to the fundamental wave current is low-frequency, so there is very little problem in terms of noise. In contrast, sound generated by the outer coil 123 vibrating due to the harmonic current $Ih_1$ of around 1 kHz to 10 kHz is high-frequency, and thus is a noise with a high necessity of being reduced.

High-frequency noise that should be reduced is caused by a force $Fh_1$ (=$Ih_1 \times B_a$) generated by the outer coil 123 due to the harmonic current $Ih_1$ of around 1 kHz to 10 kHz. Accordingly, by pressing against the outer coil 123 with a large force of at least $Fh_1$, it is possible to curtail vibrations of the outer coil 123 caused by the harmonic current $Ih_1$ and to reduce high-frequency noise. The magnitude of this force $Fh_1$ is around several dozen kg for example when copper wiring is utilized in the windings in the 100 kVA-class transformer 104, the harmonic current $Ih_1$ is around 10 [A] and the magnetic flux density $B_a$ is 1-2 [Wb/m²].

The electromagnetic force $F_2$ per unit length generated in the windings of the inner coil 122 is expressed by the cross product of the alternating current $I_2(t)$ flowing in the inner coil 122 and the magnetic flux density $B_a$, with each in vector notation in Cartesian coordinate system, as illustrated in Formula (6).

[Math 3]

$$\vec{F_2} = \vec{I_2} \times \vec{B_a} = (\vec{If_2} + \vec{Ih_2}) \times \vec{B_a} = \vec{If_2} \times \vec{B_a} + \vec{Ih_2} \times \vec{B_a} \quad \text{Formula (6)}$$

The electromagnetic force $F_2$ generated in the inner coil 122 is largely generated in the XY-plane. For example, supposing that a current $I_2(t)$ flows in the −Y direction and there is a magnetic field of magnetic flux density $B_a$ in the +Z direction in the inner coil 122, the electromagnetic force $F_2$ acts in a direction to shrink the inner coil 122 toward the center, as in the cross-sectional view of the inner coil 122 as seen from the +Z direction illustrated in FIG. 8.

As can be seen from Formula (6), even in the inner coil 122 the high-frequency noise that should be reduced is caused by a force $Fh_2$ (=$Ih_2 \times B_a$) generated by the inner coil 122 due to the harmonic current $Ih_2$ of around 1 kHz to 10 kHz, similarly to the case of the outer coil 123. Accordingly, by pressing against the inner coil 122 with a large force of at least $Fh_2$, it is possible to curtail vibrations of the inner coil 122 caused by the harmonic current $Ih_2$ and to reduce high-frequency noise.

As can be learned from the principle of generation of this kind of high-frequency noise, by pressing against the first coil section 111 with a force F at least as great as the maximum value of the forces $Fh_1$ and $Fh_2$ generated in the first coil section 111 due to the harmonic current, it is possible to curtail vibrations of the first coil section 111 caused by the harmonic current. In the second coil section 112 as well, it is similarly possible to curtail vibrations of the second coil section 112 caused by harmonic current by pressing against the second coil section 112 with the force F. Accordingly, the thickness of the first pressing member 114 is preferably determined so that it is possible to press against the first and second coil sections 111 and 112 with the force F. Through this, it becomes possible to reduce high-frequency noise generated by the first and second coil sections 111 and 112 vibrating due to high-harmonic currents.

In addition, in order to make it more difficult for the first pressing member 114 itself to vibrate, it is preferable for the first pressing member 114 to be heavy. Consequently, it is preferable for the first pressing member 114 to be made of stainless steel that is strong, heavy and non-magnetic.

The second pressing member 115 is a slab-shaped member interposed between the adjacent second coil section 112 and third coil section 113, as illustrated in FIGS. 3 and 4. The second pressing member 115, similarly to the first pressing member 114, is made of a strong, non-magnetic material such as stainless steel, ceramic and/or the like, and is preferably made of heavy stainless steel.

The second pressing member 115 has two mutually parallel main surfaces 128 and 129, with one of the main surfaces 128 abutting the second coil section 112 and the other main surface 129 abutting the third coil section 113. The thickness of the second pressing member 115 is determined so that the second coil section 112 is pressed toward the second core section 118 and the third coil section 113 is pressed toward the third core section 119. Specifically, similarly to the first pressing member 114, the thickness of the second pressing member 115 is preferably determined so that it is possible to press against the second and third coil sections 112 and 113 with a force F at least as great as the maximum value of the forces generated in the inner coils and outer coils of the second and third coil sections 112 and 113 due to harmonic currents.

The holder 116 is a member that holds from the exterior in X direction, the first and third coil sections 111 and 113 positioned on both ends, among the first to third coil sections 111 to 113 arranged in the X direction, with a force of magnitude at least F toward the first and third core sections 117 and 119, respectively. The holder 116 is provided with a first abutment member 130, a second abutment member 131, attachment members 132 and fasteners 133.

The first abutment member 130 is provided with an abutment section 134 that abuts the outer surface of the first coil section 111, and extension sections 135 that extend in the up-and-down direction (the +Z and −Z directions) from the abutment section 134. For example, holes to allow the shafts of bolts as fasteners 133 to pass are formed in the extension sections 135.

The second abutment member 131 is provided with an abutment section 136 that abuts the outer surface of the second coil section 112, and extension sections 137 extending in the up-and-down direction from the abutment section 136. For example, holes to allow the shafts of bolts as fasteners 133 to pass are formed in the extension sections 137. The extension section 135 of the first abutment member 130 and the extension section 137 of the second abutment member 131 are positioned so as to face each other in the X direction.

The first abutment member 130 and the second abutment member 131, similarly to the first pressing member 114, are made of a strong, non-magnetic material such as stainless steel, ceramic and/or the like, and are preferably made of heavy stainless steel.

The attachment members 132 are frame-shaped members and are disposed on the bottom and top of the transformer 104. The top coupler 120 or the bottom coupler 121 of the iron core 110 is accommodated in the interior of the attachment member 132. The attachment members 132 have a length in the X direction shorter than the combined length of the first to third coil sections 111 to 113, and are disposed between the extension section 135 of the first abutment member 130 and the extension section 137 of the second abutment member 131. Holes to allow the shafts of bolts as fasteners 133 are formed in the ends of the attachment members 132 facing the extension sections 135 and 137.

The fasteners 133 are provided with bolts and nuts, for example. The fasteners 133 fasten together the ends of each attachment member 132 in the X direction and extension section 135 of the first abutment member 130 and the extension section 137 of the second abutment member 131 that are positioned near the ends thereof. Specifically, a fastener 133 fastens for example by a bolt inserted into a hole in +X-side end of the attachment member 132 and the extension section 135 of the first abutment member 130 being screwed onto a nut with a predetermined tightening force. Similarly, a fastener 133 fastens by a bolt inserted into a hole in −X-side end of the attachment member 132 and the extension section 137 of the second abutment member 131 being screwed onto a nut with a predetermined tightening force.

The force by which the fasteners 133 fasten is preferably large enough that the first and third coil sections 111 and 113 are pressed against with a force F of at least a fixed value toward the first and third core sections 117 and 119. This force F of at least a fixed value is a force F at least as great as the maximum value of the forces generated in the inner coils and the outer coils of the first and third coil sections 111 and 113 due to harmonic currents. Through this, it becomes possible to curtail vibrations of the first and third coil sections 111 and 113 caused by harmonic currents, and to curtail high-frequency noise.

In this embodiment, the length of the attachment members 132 in the X direction is shorter than the combined length of the first to third coil sections 111 to 113 in the X direction, as described above. Consequently, when the fasteners are provided with bolts and nuts, it is possible to adjust the force F with which the first and second abutment members 130 and 131 press against the first and third coil sections 111 and 113 by appropriately setting the pressing force.

The foregoing explains the composition of the transformer 104 according to this embodiment.

As can be seen from Formula (5), reducing the current density or the magnetic flux density $B_a$ of the first and second coil sections 111 and 112 also makes the electromagnetic force generated in the first and second coil sections 111 and 112 smaller, so it is possible to curtail vibrations of the first and second coil sections 111 and 112. However, making the dimensions of the iron core larger to that end causes the dimensions and weight of the transformer to become larger. In addition, using materials in which vibrations are less likely to occur is expensive.

With the inverter device 100 or transformer 104 according to this embodiment, it is possible to curtail vibrations of the first and second coil sections 111 and 112 by the first pressing member 114. The dimensions of the transformer 104 are virtually unchanged by the first pressing member 114. The increase in the weight of the transformer 104 by the first pressing member 114 is small compared to the weight of the transformer 104. In addition, the first pressing member 114 may be made of a material such as stainless steel and/or the like as described above and thus can be manufactured inexpensively. Consequently, with the first pressing member 114, it becomes possible to reduce high-frequency noise emitted from the first and second coil sections 111 and 112 without greatly increasing the dimensions, weight and cost of the transformer 104.

Similarly, with the second pressing member 115, it becomes possible to reduce high-frequency noise emitted from the second and third coil sections 112 and 113 without greatly increasing the dimensions, weight and cost of the transformer 104.

Accordingly, by providing the pressing members 114 and 115 between all of the coil sections 111 to 113, it becomes possible to reduce high-frequency noise emitted from all of the first to third coil sections 111 to 113 without greatly increasing the dimensions, weight and cost of the transformer 104.

With the holder 116, it is possible to curtail vibrations of the first and third coil sections 111 and 113. The increases in the dimensions and weight of the transformer 104 by the holder 116 are relatively small. In addition, the holder 116 may be made of a material such as stainless steel and/or the like and thus can be manufactured inexpensively. Consequently, with the holder 116, it becomes possible to reduce high-frequency noise emitted from the first and third coil sections 111 and 113 without greatly increasing the dimensions, weight and cost of the transformer 104.

By providing the first and second pressing members 114 and 115 and the holder 116, it is possible to press against each of the first to third coil sections 111 to 113 from both ends without greatly adding to the dimensions, weight and cost of the transformer 104. Consequently, it becomes possible to significantly reduce high-frequency noise emitted from all of the first to third coil sections 111 to 113. For example, by providing the first and second pressing members 114 and 115 and the holder 116, it is possible to reduce vibration energy of the first to third coil sections 111 to 113 by around one-half and to reduce noise by 3 dB or more, although this is also dependent on the force by which the fasteners 133 fasten.

In particular, with the inverter device 100 mounted on an electric train, high-voltage power flows, so the electromagnetic force generated in each of the first to third coil sections 111 to 113 due to harmonic currents becomes great. Consequently, there is a tendency for high-frequency noise to become larger.

In addition, in the case of an electric train on which the inverter device 100 is mounted, the inverter device 100 typically provides power to lighting, air conditioners and/or the like in the train and thus operates constantly while the train is in operation. High-frequency noise from the transformer 104 is emitted during operation of the inverter device 100, and thus is heard in the ears of passengers constantly regardless of whether the train is running or is stopped. Because high-frequency noise is particularly jarring to people's ears, reducing high-frequency noise constantly emitted from the transformer 104 of the inverter device 100 is extremely important in order to improve comfort in the train.

With conventional transformers, particularly dry-type transformers, only the tension of the windings is used to curtail the coil vibrations, so when the inverter is activated, a large high-frequency noise is emitted. With the inverter device according to this embodiment, it is possible to curtail vibrations of each of the coil sections 111 to 113 through the pressing members 114 and 115 and the holder 116, even when high-voltage power flows. Consequently, it becomes possible to strikingly improve comfort in the train by reducing high-frequency noise that is jarring to passengers' ears.

Hereinafter, an example of a method of manufacturing the transformer 104 according to this embodiment is described.

An iron core 110 is prepared (see FIG. 5). The inner spacers 124 abutting the first to third core sections 117 to 119 are positioned at predetermined intervals. Windings are wound directly around the inner spacers 124. Through this, the inner coils 122 of the first to third coil sections 111 to 113 are formed.

The outer spacers 125 abutting the various inner coils 122 are positioned at predetermined intervals. Windings are wound directly around the outer spacers 125. Through this, the outer coils 123 of the first to third coil sections 111 to 113 are formed. As illustrated in the perspective view of FIG. 9, the first to third coil sections 111 to 113 are provided.

The first pressing member 114 is press-inserted between the first and second coil sections 111 and 112, and the second pressing member 115 is press-inserted between the second and third coil sections 112 and 113. This pressing means insertion while applying force in the insertion direction with, for example, a hammer and/or the like. Through this, the first and second pressing members 114 and 115 are assembled as illustrated in the perspective view in FIG. 10.

The attachment members 132 are respectively positioned at the top and bottom of the iron core 110, as illustrated in the perspective view in FIG. 11. Specifically, the attachment members 132 are positioned so as to respectively accommodate the top coupler 120 and the bottom coupler 121 roughly in the center of the interiors thereof.

The first abutment member 130 and the second abutment member 131 are positioned with both ends of the attachment members 132 in the X direction facing the extension sections 135 and 137, so that the respective holes line up in the X direction. Bolts are inserted into each of the holes and are fastened by nuts with a predetermined force, and thus the first abutment member 130 and second abutment member 131 are both fastened to the attachment member 132. Through this, the holder 116 is attached and the transformer 104 according to this embodiment is manufactured (see FIG. 3).

In this manner, in the transformer 104 according to this embodiment, the process of curtailing high-frequency noise is constituted by the process of attaching the first and second pressing members 114 and 115 and the process of attaching the holder 116. With these processes, only relatively simple work is necessary, as described above. Accordingly, with this embodiment, it becomes possible to easily manufacture the transformer 104 with curtailing high-frequency noise.

An embodiment of the present disclosure was described above, but this is intended to be illustrative and not limiting.

For example, the inverter device 100 according to the present disclosure is mounted on not only an electric train but also any equipment, devices and/or the like. The transformer 104 is not limited to being applied to the inverter device 100 but may also be mounted on arbitrary equipment, devices and/or the like. The transformer 104 is not limited to a three-phase transformer but may also be a single-phase transformer. The first and second pressing members 114 and 115 and the holder 116 may be applied to a reactor provided with coils arranged in a fixed direction, similar to the transformer 104 according to the embodiment.

For example, it would be fine for each of the first to third core sections 117 to 119 to be column shaped, and it would be fine for the cross-sectional shape as viewed from the Z-direction to be circular or the like. In place of the holes for inserting bolts, it would be fine for female screw sections to be provided in the ends of the attachment members 132 facing the extension sections 135 and 137. In this case, the fasteners 133 are provided with the female screw sections and bolts.

The present disclosure further includes the below modified embodiments, and also includes a technical scope equivalent to the embodiment and the modified embodiments.

First Modified Embodiment

The switching element 106 and the diode element 107 included in the inverter circuit 103 may be wide-gap semiconductor elements formed of wide-bandgap semiconductors such as silicon carbide, gallium nitride materials, diamond and/or the like, for example. In this case, it is possible to make the inverter circuit 103 more compact than the inverter circuit 103 that is provided with the switching element 106 and the diode element 107 formed of silicon. In addition, because power loss is low, it is possible to make the switching elements 106 and the diode elements 107 have high efficiency, and hence it becomes possible to make the inverter circuit 103 have high efficiency.

By utilizing a wide-bandgap semiconductor element, it is possible to perform the on/off operations at high speed. Consequently, the harmonic currents included in the current output from the inverter circuit 103 become great and there is a concern that high-frequency noise caused by the harmonic currents could become large. With the transformer 104 described in the embodiment, even if a wide-bandgap semiconductor element is utilized, it is possible to curtail high-frequency noise. Accordingly, it becomes possible to provide a compact and high-efficiency inverter device 100 while reducing high-frequency noise.

Second Modified Embodiment

The material of the windings forming the inner coil 122 and the outer coil 123 is not limited to copper, and for example may be aluminum. By utilizing aluminum wire, it is possible to reduce the weight and cost of the coil sections 111 (112, 113) compared to utilizing copper wire and/or the like. When the coil sections 111 (112, 113) become lighter, there is a concern that vibrations caused by harmonic currents will more readily occur so that high-frequency noise becomes larger. In the present disclosure, it is possible to curtail vibrations of the coil sections 111 (112, 113) with the pressing member 114 (115) and the holder 116, so it is possible to curtail high-frequency noise from becoming large. Accordingly, it becomes possible to reduce the weight and cost of the transformer 104 while reducing the high-frequency noise thereof.

Third Modified Embodiment

The fasteners 133 are not limited to bolts and nuts, and for example may be instruments and/or the like that hold and fasten the ends of the attachment members 132 and the extension sections 135 and 137 of the first and second abutment members 130 and 131. Even with these instruments, by adjusting the pressing force it is possible to adjust the force F with which the first abutment member 130 and the second abutment member 131 press against the first and third coil sections 111 and 113.

Fourth Modified Embodiment

It would be fine for the transformer 104 not to include the holder 116. Through this, it is possible to give the transformer 104 a simple configuration. In this case, vibrations of the first to third coil sections 111 to 113 are curtailed by the first and second pressing members 114 and 115. Accordingly, it is possible to reduce high-frequency noise with a simple configuration.

Fifth Modified Embodiment

It would be fine for the first pressing member 114 to have a tapered section 239 connected to an end of a slab-shaped section 238 having two main surfaces 126 and 127, the thickness of the tapered section 239 gradually thinning, as illustrated in the cross-section of XY-plane in FIG. 12. It would be fine for the second pressing member 115 to similarly have a tapered section 239. Through this, pressing of the first pressing member 114 (second pressing member 115) becomes easier and it becomes possible to reduce the worry of damaging the first and second coil sections 111 and 112 (second and third coil sections 112 and 113) during pressing.

INDUSTRIAL APPLICABILITY

The present disclosure can be used in inverter devices mounted on railway cars, power-supply units for industrial machinery, electric cars, power conditioners for solar power generation devices and/or the like, and in the manufacture thereof. In addition, the present disclosure can be used in transformers mounted on inverter devices, transformers used in power plants, substations and/or the like, pole-type transformers and/or the like, and in the manufacture thereof.

REFERENCE SIGNS LIST

100 Inverter device
103 Inverter circuit
104 Transformer
106 Switching element
107 Diode element
110 Iron core
111 First coil section
112 Second coil section
113 Third coil section
114 First pressing member
115 Second pressing member
116 Holder
117 First core section
118 Second core section
119 Third core section
120 Top coupler
121 Bottom coupler
122 Inner coil
123 Outer coil
124 Inner spacer
125 Outer spacer
130 First abutment member
131 Second abutment member
132 Attachment member
133 Fastener
134,136 Abutment section
135,137 Extension section

The invention claimed is:

1. An inverter device for railway cars comprising:
an inverter circuit that converts DC power into AC power and outputs the AC power; and
a transformer that converts a voltage of the AC power output from the inverter circuit, and that outputs AC power at the converted voltage;
wherein the transformer includes:
an iron core having a plurality of core sections each with a column shape having an axis in a first direction, the plurality of core sections being arranged in a second direction orthogonal to the first direction;
a plurality of coil sections, each including an inner coil wound around each of the plurality of core sections and an outer coil wound around the inner coil, that convert the voltage of the AC power output from the inverter circuit, and that output AC power at the converted voltage; and
a pressing member that is a non-magnetic substance, and that is interposed between adjacent coil sections and presses against the adjacent coil sections arranged by being press-inserted between all adjacent coil sections among the plurality of coil sections, the pressing member having a thickness that presses against each of the adjacent coil sections toward each of the plurality of core sections around which each of the adjacent coil sections is wound with a pressing force at least as great as a maximum value of electromagnetic force generated in each inner coil and outer coil included in each of the adjacent coil sections due to harmonic currents; and
a holder arranged to hold the plurality of coil sections in the second direction, the holder being positioned exterior of the coil sections at opposite ends, respectively, of the plurality of coil sections in the second direction, and pressing against each of the coil sections positioned at said opposite ends, toward each of the plurality of core sections around which each of the plurality of coil sections is wound, with a pressing force at least as great as the maximum value of electromagnetic force generated in each inner coil and outer coil included in each of the plurality of coil sections positioned at both ends due to harmonic currents,
wherein the iron core is formed by accumulating rectangular thin plates in which a rectangular hole is provided,
the holder includes,
a first abutment member that is slab-shaped, having an abutment section that abuts an exterior surface of a coil section at one of said ends, and an extension section that is provided so as to extend from the abutment section in both the first direction and an opposite direction,
a second abutment member that is slab-shaped, having an abutment section that abuts an exterior surface at the other of said ends, and an extension section that is provided so as to extend from the abutment section in both the first direction and the opposite direction, and is provided so as to face the extension section of the first abutment member,
attachment members of a length shorter than a distance between the exterior surfaces of the plurality of coil sections positioned at said ends, the attachment members being provided between each of the facing extension sections of the first and the second abutment members, and
a plurality of bolts and nuts for fastening both ends of the attachment members to the extension sections positioned near the ends of the attachment members, wherein the plurality of bolts and nuts is tightened with a predetermined tightening force, thereby pressing against each of the exterior surfaces of the plurality of coil sections positioned at both ends toward each of the plurality of core sections around which each of the plurality of coil sections is wound with a pressing force at least as great as the maximum value of the electromagnetic force by the slab-shaped first abutment member and the slab-shaped second abutment member.

2. The inverter device according to claim 1, wherein the pressing member is formed of stainless steel.

3. The inverter device according to claim 1, wherein each of the plurality of coil sections further includes:
a plurality of inner spacers provided between each of the plurality of core sections and the inner coil so as to form a gap for allowing air to pass in the lengthwise direction of each of the plurality of core sections between each of the plurality of core sections and the inner coil; and
a plurality of outer spacers provided between the inner coil and the outer coil so as to form a gap for allowing air to pass in the lengthwise direction of each of the plurality of core sections between the inner coil and the outer coil.

4. The inverter device according to claim 2, wherein each of the plurality of coil sections further includes:
a plurality of inner spacers provided between each of the plurality of core sections and the inner coil so as to form a gap for allowing air to pass in the lengthwise direction of each of the plurality of core sections between each of the plurality of core sections and the inner coil; and
a plurality of outer spacers provided between the inner coil and the outer coil so as to form a gap for allowing air to pass in the lengthwise direction of each of the plurality of core sections between the inner coil and the outer coil.

5. The inverter device according to claim 1, wherein the inverter circuit includes an element formed of a wide-bandgap semiconductor.

6. The inverter device according to claim 5, wherein the wide-bandgap semiconductor is silicon carbide, a gallium nitride based material or diamond.

7. A transformer for railway cars comprising:
an iron core having a plurality of core sections each with a column shape having an axis in a first direction, the plurality of core sections being arranged in a second direction orthogonal to the first direction;
a plurality of coil sections, each including an inner coil wound around each of the plurality of core sections and an outer coil wound around the inner coil;
a pressing member that is a non-magnetic substance-arranged by being press-inserted between all adjacent coil sections among the plurality of coil sections, the pressing member having a thickness that presses against each of the adjacent coil sections toward each of the plurality of core sections around which each of the adjacent coil sections is wound with a pressing force at least as great as a maximum value of electromagnetic force generated in each inner coil and outer coil included in each of the adjacent coil sections due to harmonic currents; and
a holder arranged to hold the plurality of coil sections in the second direction, the holder being positioned exterior of the coil sections at opposite ends, respectively, of the plurality of coil sections in the second direction, and pressing against each of the coil sections positioned at said opposite ends, toward each of the plurality of core sections around which each of the plurality of coil sections is wound, with a pressing force at least as great as the maximum value of electromagnetic force generated in each inner coil and outer coil included in each of the plurality of coil sections positioned at both ends due to harmonic currents,
wherein the iron core is formed by accumulating rectangular thin plates in which a rectangular hole is provided,
the holder includes,
a first abutment member that is slab-shaped, having an abutment section that abuts an exterior surface of a coil section at one of said ends, and an extension section that is provided so as to extend from the abutment section in both the first direction and an opposite direction,
a second abutment member that is slab-shaped, having an abutment section that abuts an exterior surface at the other of said ends, and an extension section that is provided so as to extend from the abutment section in both the first direction and the opposite direction, and is provided so as to face the extension section of the first abutment member,
attachment members of a length shorter than a distance between the exterior surfaces of the plurality of coil sections positioned at said ends, the attachment members being provided between each of the facing extension sections of the first and the second abutment members, and
a plurality of bolts and nuts for fastening both ends of the attachment members to the extension sections positioned near the ends of the attachment members, wherein the plurality of bolts and nuts is tightened with a predetermined tightening force, thereby pressing against each of the exterior surfaces of the plurality of coil sections positioned at both ends toward each of the plurality of core sections around which each of the plurality of coil sections is wound with a pressing force at least as great as the maximum value of the electromagnetic force by the slab-shaped first abutment member and the slab-shaped second abutment member.

8. A manufacturing method of a transformer for railway cars, the manufacturing method comprising;
preparing an iron core formed by accumulating rectangular thin plates in which a rectangular hole is provided, the iron core having a plurality of core sections each with a column shape having an axis in a first direction and being arranged in a second direction orthogonal to the first direction;
forming a plurality of coil sections, each including an inner coil wound around each of the plurality of core sections, and an outer coil wound around the inner coil;
sequentially press-inserting a pressing member between all adjacent coil sections among the plurality of coil sections, the pressing member having a thickness that presses against each of the adjacent coil sections toward each of the plurality of core sections around which each of the adjacent coil sections is wound with a pressing force at least as great as a maximum value of electromagnetic force generated in each inner coil and outer coil included in each of the adjacent coil sections due to harmonic currents; and
providing a holder arranged to hold the plurality of coil sections in the second direction, the holder being positioned exterior of the coil sections at opposite ends, respectively, of the plurality of coil sections in the second direction, and pressing against each of the coil sections positioned at said opposite ends, toward each of the plurality of core sections around which each of the plurality of coil sections is wound, with a pressing force at least as great as the maximum value of electromagnetic force generated in each inner coil and outer coil included in each of the plurality of coil sections positioned at both ends due to harmonic currents, wherein providing the holder includes:
  arranging a first abutment member that is slab-shaped, having an abutment section that abuts an exterior surface of a coil section at one of said ends, and an extension section that is provided so as to extend from the abutment section in both the first direction and an opposite direction,
  arranging a second abutment member that is slab-shaped, having an abutment section that abuts an exterior surface at the other of said ends, and an extension section that is provided so as to extend from the abutment section in both the first direction and the opposite direction, and is provided so as to face the extension section of the first abutment member,
  arranging attachment members of a length shorter than a distance between the exterior surfaces of the plurality of coil sections positioned at said ends, the attachment members being provided between each of the facing extension sections of the first and the second abutment members, and
  arranging a plurality of bolts and nuts for fastening both ends of the attachment members to the extension sections positioned near the ends thereof of the attachment members, wherein
the plurality of bolts and nuts is tightened with a predetermined tightening force, thereby pressing against each of the exterior surfaces of the plurality of coil sections positioned at both ends toward each of the plurality of core sections around which each of the plurality of coil sections is wound with a pressing force at least as great as the maximum value of the electromagnetic force by the slab-shaped first abutment member and the slab-shaped second abutment member.

* * * * *